US006206554B1

(12) United States Patent
Schuster et al.

(10) Patent No.: US 6,206,554 B1
(45) Date of Patent: Mar. 27, 2001

(54) MOTOR VEHICLE LIGHT

(75) Inventors: Kurt Schuster; Andreas Schien, both of Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/273,079

(22) Filed: Mar. 19, 1999

(30) Foreign Application Priority Data

Jun. 25, 1998 (DE) ........................................ 298 11 330 U

(51) Int. Cl.[7] ........................................ B60Q 1/04

(52) U.S. Cl. ........................ 362/518; 362/297; 362/300; 362/539

(58) Field of Search .................................. 362/516, 517, 362/518, 520, 538, 539, 299, 300, 303, 304, 307, 305, 346, 297

(56) References Cited

U.S. PATENT DOCUMENTS 4,959,757 * 9/1990 Nakata ................................ 362/520
5,067,053 * 11/1991 Akizuki ................................ 362/346

FOREIGN PATENT DOCUMENTS 297 09 279 U1 9/1997 (DE) .

* cited by examiner

Primary Examiner—Y. Quach
(74) Attorney, Agent, or Firm—Michael J. Striker

(57) ABSTRACT

A motor vehicle light, comprising a concavely curved reflector; a light source inserted in the reflector; a cover element arranged after the light source as considered in a light outlet direction, by which the light source is at least partially covered when seen from outside on the motor vehicle light; a light-permeable disk for covering the motor vehicle light in the light outlet direction and which is free from optical profiles, the reflector being shaped so that a light emitted by the light source is reflected by the reflector so that it passes on the cover element at least substantially unaffected.

9 Claims, 2 Drawing Sheets

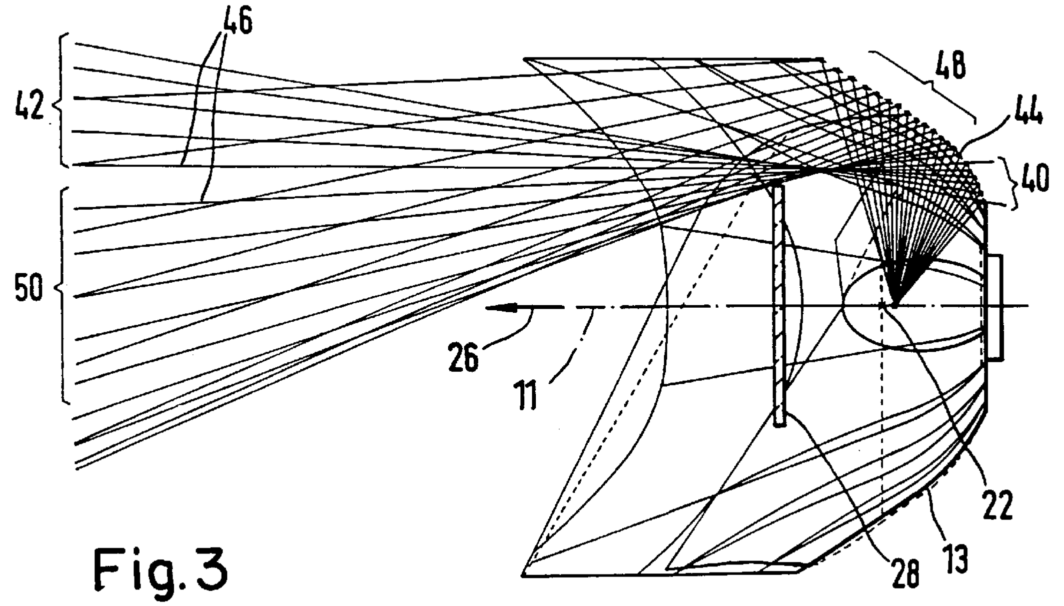
Fig.3
Fig.4
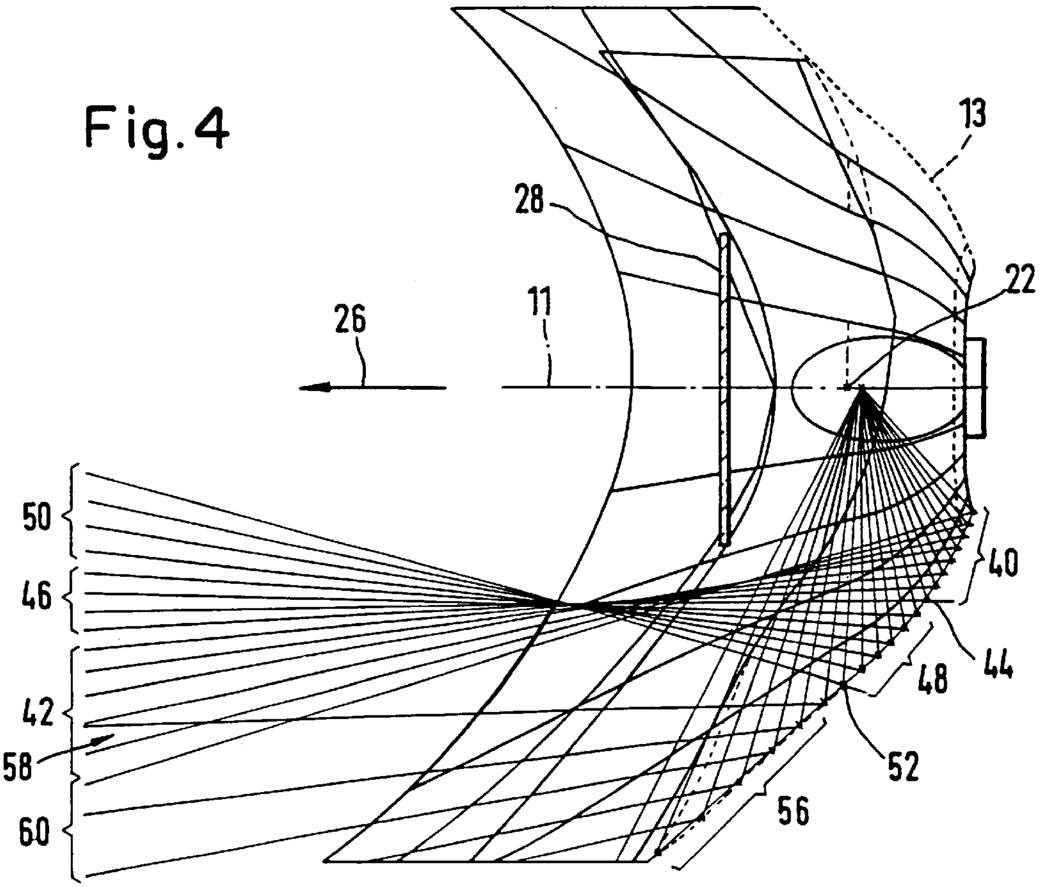

MOTOR VEHICLE LIGHT

BACKGROUND OF THE INVENTION

The present invention relates to generally to motor vehicles lights.

One of such motor vehicle lights is disclosed for example in the German patent document DE 297 09 279 U1. The motor vehicle light has a concavely curved reflector, in which a light source is inserted. In the light outlet direction after the light source, a cover element is provided through which the light source is partially covered when seen from outside of the light. The light outlet direction of the light is covered with a light-permeable disk which is free of optical profiles. The shape of the reflector is determined by a computer calculations and so that the light emitted through the reflector from the light source is reflected for producing a predetermined light distribution. However, no recommendations are provided for the shape of the reflector for producing of the predetermined light distribution.

SUMMARY OF THE INVENTION

Accordingly, it is an object of the present invention to provide a motor vehicle light which avoids the disadvantages of the prior art.

In keeping with these objects and with others which will become apparent herein after, one feature of present invention resides, briefly stated, in a motor vehicle light, in which the reflector is shaped so that the light emitted by the light source is reflected by it so that it passes on the cover element at least substantially unaffected.

Wherein the motor vehicle light is designed in accordance with the present invention, then the whole light reflected by the reflector can exit the motor vehicle light.

In accordance with further features of the present invention, the motor vehicle light is formed so that an illumination intensity distribution with sufficiently high maximum illumination intensities is obtained in its center.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a reflector of the motor vehicle light in a horizontal longitudinal section with a beam path of the light reflected by it; and FIG. 4 is a view showing the reflector in a vertical longitudinal section with the beam path of the light reflected by it.

DESCRIPTION OF PREFERRED EMBODIMENTS

Figure 1:
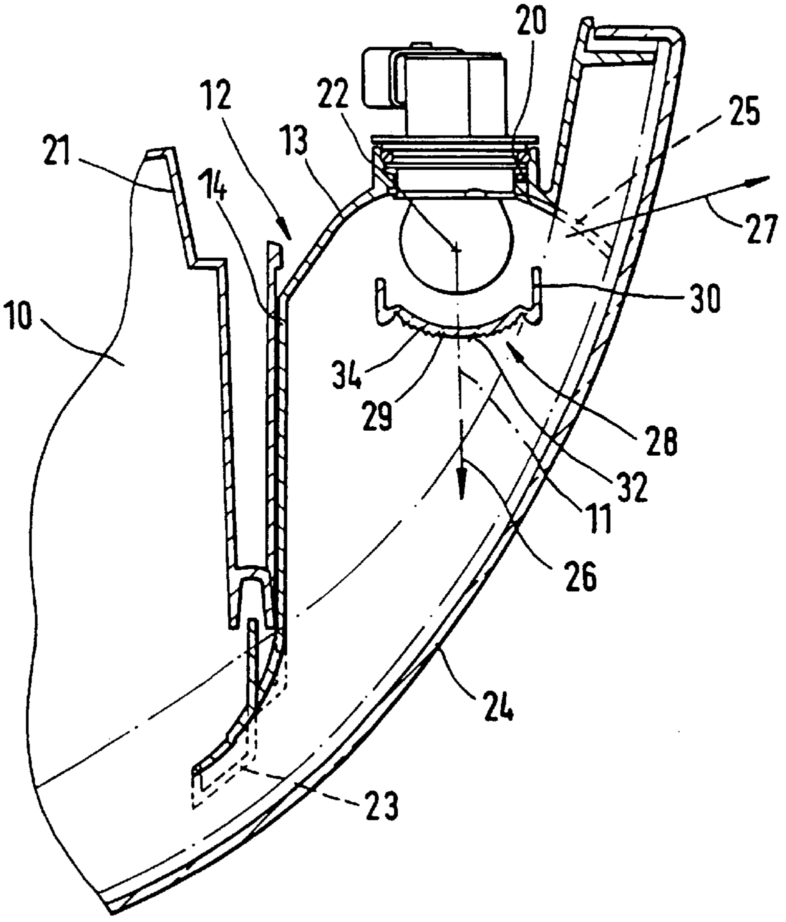
FIG. 1 is a view showing a motor vehicle light in accordance with the present invention in a horizontal longitudinal section.

A motor vehicle light shown in FIGS. 1–4 serves in particular as a front blinking light. The motor vehicle light is arranged therefore laterally near a headlight 10 toward an outer edge of the motor vehicle. The motor vehicle light has a housing 12 with a concavely curved rear wall 13. A reflective coating is applied on the front side of the concavely curved rear wall 13 in a light outlet direction and serves as a reflector. A flat wall 14 as well as upper and lower flat walls 16 and 18 are connected to the reflector 13 and extend on the housing 12 laterally to the headlight 10. The walls extend in the light outlet direction and are also provided with a reflecting coating. The housing 12 can be composed of metal or preferably from synthetic plastic material.

The reflector 13 has an apex and is provided in the apex with an opening 20. A light source 22, for example formed as an incandescent lamp is inserted in the opening 20. The incandescent lamp 22 has a glass bulb which is colored or coated in a signal color required for the motor vehicle light. For the use of the motor vehicle light as a blinking light, it can be colored in yellow or orange color. The light outlet opening of the motor vehicle light is covered with a light-permeable disk 24 which is free of optical profiles.

The cover disk 24 can be composed of glass or synthetic plastic material and is preferably colorless. The cover disk 24 can serve as a cover disk for the headlight 10, so that it extends over the light outlet openings of the motor vehicle light and the headlight 10. The cover disk 24 can extend to the lateral edge of the motor vehicle opposite to the light outlet direction until behind the reflector 13 to make possible a light passage also in the lateral direction. The light outlet direction of the motor vehicle light is substantially parallel to the optical axis 11 of the reflector 13 as identified with the arrow 26. The reflector 13 can be provided with a lateral opening 25 toward the outer edge of the motor vehicle. The lateral opening provides a lateral light outlet through the lateral region of the cover disk 24 in direction of the arrow 27 transversely to the light outlet direction 26. The housing 12 of the motor vehicle light can be formed of one piece with a screen frame 23 which is connected with the housing 21 of the headlight 10. In the region of the headlight housing 21, it serves for covering a gap between the renewal headlight housing 21 and at least one reflector arranged in it. The reflector 12 is formed on a part of the screen frame 23 which extends outwardly beyond the headlight 21. The screen frame 23 is provided on its visible surface with a reflecting coating.

A cover element 28 is arranged in the light outlet direction 26 with a distance after the light source 22. The light source 22 is at least partially covered when viewed in the motor vehicle light, so that it is not directly visible. The cover element 28 is formed as a plate which extends transversely to the optical axis 11 of the reflector 12. It can be flat or can be curved in any manner. The cover element 28 can be composed of synthetic plastic material or metal, and can be light-impermeable, partially light-permeable or light-permeable. In the embodiment shown in FIGS. 1 and 2, the cover element 28 is cap shaped. It has a bottom 29 extending transversely to the optical axis 11 as well as a hollow-cylindrical portion 30 which is connected with it, and extends opposite to the light outlet direction 26 to the reflector 13 substantially parallel to the optical axis 11. The portion 30 extends opposite to the light outlet direction 26 for such a distance that the light emitted by the light source 22 passes on it unaffected and can fall on the reflector 13. The portion 30 can be formed over the whole periphery of the bottom 29 or only over a part of its periphery, for example laterally on it.

Figure 2:
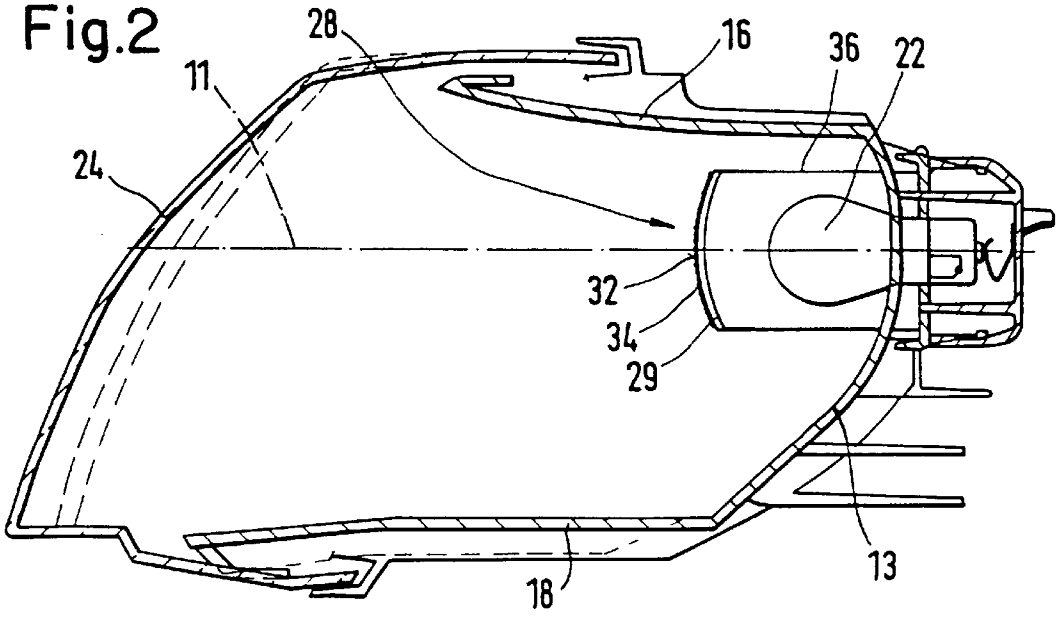
FIG. 2 is a view showing the inventive motor vehicle light in a vertical longitudinal section.

In the shown embodiment, the cover element 28 is composed of light permeable synthetic plastic or glass and has a coating 32 at least locally on an outer surface facing away from the light source 22. The coating 32 can be partially reflected and partially light-permeable. The coating 32 for example has a silver color or another color, for example the color of the chassis of the motor vehicle. The light emitted by the light source 22 can pass at least partially through the cover element 28 and its coating 32, while the light coming from outside in the motor vehicle light can pass only partially through the coating 32 in the cover element 28 and partially is reflected on the coating 32. Therefore the color of the glass bulb of the light source 22 is not visible or at least slightly visible. The bottom 29 of the cover element 28 can be provided with optical profiles 34. They can be formed for example as ring-shaped concentric profiles which form a Fresnel lense. Due to the optical profiles, the light emitted by the light source 22 to the bottom 29 is collected and at least approximately oriented parallel to the optical axis 11. The optical profiles 34, as shown in FIGS. 1 and 2, can be arranged at the side of the bottom 29 which faces in the light outlet direction 26 or at the side which is opposite to the light outlet opening 26. The bottom 29 can be approximately flat or provided with a concave or convex curvature as shown in FIGS. 1 and 2. The cover element 28 is connected with the reflector 12 for example through one or several supports 36. The supports 36 can be held by screws or arresting formations on the reflector 12.

The shape of the reflector 13 is formed so that the light emitted by the light source 22 is reflected by the reflector so that it passes at least substantially unaffected on the cover element 28 and exits the motor vehicle light to produce an illumination intensity distribution required for the use of the motor vehicle light. The shape of the reflector 13 is illustrated in FIGS. 3 and 4. In the apex region 40 which surrounds the opening 20 the curvature of the reflector 13 is such that the light emitted by the light source 22 is reflected from it as divergingly extending light rays 42 with respect to the optical axis 11. With increasing distance from the optical axis 11, the curvature of the apex region 40 changes so that the light rays 42 reflected by it extend less divergently, or in other words their inclination relative to the optical axis 11 decreases. FIGS. 3 and 4, for the sake of visibility, show only the reflected light rays for one half of the reflector 13. The light rays are reflected from the other half of the reflector 13 and extend at least approximately mirror-inverted relative to the optical axis 11 with regard to the rays 42. The diverging course of the light rays 42 means that they extend in the light outlet direction 26 away from the optical axis 11 and thereby pass on the cover element 28 and form a horizontally spread light bundle. This horizontally spread light bundle exits the motor vehicle light and provides for a sufficient visibility of the light emitted by the motor vehicle light in directions which deviate from the light outlet direction 26. The cover element 28 have a greater diameter than the opening 20 of the reflector 13. Due to the the diverging course of the light rays reflected from the apex region 40 of the reflector 13, it can pass on the cover element 28 unaffected.

A further region 48 extends from the apex region 40 of the reflector 14 with a greater distance from the optical axis 11. Its curvature is selected so that the light emitted by the light source 22 is reflected by it as convergingly extending light rays 50 with respect to the optical axis 11. The converging course of the light rays 50 means that they extend in the light outlet direction 26 to the optical axis 11 and intersect the optical axis. The curvature of the region 48 is preferably such that, starting from the apex region 40 with an increasing distance from the optical axis 11 the light rays 50 reflected by it extend increasingly more convergingly, or in other words have a stronger inclination to the optical axis 11. With a further increase of a distance from the optical axis 11, the light rays are reflected by this region more convergingly. Due to the converging course of the light rays 50 reflected by the region 48 the illumination intensity distribution provided by the motor vehicle light in the center has a sufficiently high maximum illumination intensity value in a region around the optical axis 11.

The transition 44 between the apex region 40 and the region 48 is continuous without steps or bends. For this purpose a transition region 44 is provided, in which the curvature is such that the light emitted by the light source 22 is reflected as light rays 46 extending substantially parallel to the optical axis 11. The divergence of the light rays 42 reflected by the apex region 40 reduces with increasing distance from the optical axis 11 to the transition region 44, and the convergence of the light rays 50 reflected by the region 48 first increases as before starting from the transition region 44 with increasing distance from the optical axis 11, and finally decreases.

An edge region 56 can be connected with the region 48 with a greater distance from the optical axis 11. Each curvature is selected so that the light emitted by the light source 22 is reflected from it as light rays 58 extending substantially parallel to the optical axis 11 or as light rays 60 which extend divergingly with increasing distance from the optical axis 11 relative to the optical axis. A transition region 52 is again provided between the region 48 and the edge region 56 for forming a continuous, stepless and bend free transition. In the transition region 52 the curvature changes from a characteristic of the region 48 which provides a converging course of the light rays 50 to a characteristic of the edge region 56 which provides a parallel or diverging course of the light rays 58 or 60. The light rays 58 which are reflected by the edge region 56 and are parallel to the optical axis 11 can be used for producing a higher maximum illumination intensity value in the center of the illumination intensity distribution, or the light rays 60 with the diverging course reflected by the edge region 56 can be used for producing a spread light bundle for improving the visibility from directions which deviate from the light outlet direction 26.

When the cover element 28 as described above is formed at least partially light-permeable and has optical profiles 34 which form the Fresnel lense, the light which is emitted by the light source 22, not engaged by the reflector 13 and passes through the cover element 28 can be used for producing the illumination intensity distribution, in particular for producing higher maximum illumination intensity values in the center. The above described construction of the reflector 13 is formed so that the light reflected from it can pass on the cover element 28 and produce the predetermined illumination intensity distribution without optical profiles arranged on the cover disk 24 for this purpose.

While the invention has been illustrated and described as embodied in motor vehicle light, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A motor vehicle light, comprising a concavely curved reflector; a light source inserted in said reflector so that light emitted by said light source is reflected by said reflector in a predetermined direction; a cover element arranged after said light source as considered in said direction and at least partially covering said light source when viewing the motor vehicle light from outside; a light-permeable disk for covering the motor vehicle light in said direction and which is free from optical profiles, said reflector being shaped so that the light emitted by said light source and reflected by said reflector passes on said cover element at least substantially unaffected, said reflector having an apex region with such a curvature that the light emitted by said light source is reflected by said apex region as divergingly extending light rays with regard to an optical axis of said reflector, said reflector also having a further region which follows said apex region and is arranged at a greater distance from said optical axis and has such a curvature that the light emitted by said light source can be reflected by said further region as convergently extending light rays with regard to said optical axis, said curvature of said further region of said reflector being selected so that the light emitted by said source and reflected by further region, with an increasing distance from said optical axis is reflected as increasingly more convergingly extending light rays, the curvature of said apex region of said reflector being selected so that the light emitted by said light source and reflected by said apex region, with an increasing distance from said optical axis is reflected as increasingly less divergingly extending light rays, said reflector having an edge region which adjoins said further region and is arranged at a greater distance from said optical axis and has a curvature such that the light emitted by said light source and reflected by said edge region is reflected as light rays selected from the groups consisting of light rays extending substantially parallel to said optical axis and as divergingly extending light rays with regard to said optical axis.

2. A motor vehicle light as defined in claim 1, wherein said cover element is light-impermeable.

3. A motor vehicle light, comprising a concavely curved reflector; a light source inserted in said reflector so that light emitted by said light source is reflected by said reflector in a predetermined direction; a cover element arranged after said light source as considered in said direction and at least partially covering said light source when viewing the motor vehicle light from outside; a light-permeable disk for covering the motor vehicle light in said direction and which is free from optical profiles, said reflector being shaped so that the light emitted by said light source and reflected by said reflector passes on said cover element at least substantially unaffected, said cover element having a surface which faces away from said light source and is provided locally with a partially reflecting and a partially light-permeable coating.

4. A motor vehicle light as defined in claim 3, wherein said reflector has an apex region with such a curvature that the light emitted by said light source is reflected by said apex region as divergingly extending light rays with regard to an optical axis of said reflector, said reflector also having a further region which follows said apex region and is arranged at a greater distance from said optical axis and has such a curvature that the light emitted by said light source can be reflected by said further region as convergently extending light rays with regard to said optical axis.

5. A motor vehicle light as defined in claim 4, wherein the curvature of said apex region of said reflector is selected so that the light emitted by said light source and reflected by said apex region, with an increasing distance from said optical axis is reflected as increasingly less divergingly extending light rays.

6. A motor vehicle light as defined in claim 4, wherein said curvature of said further region of said reflector is selected so that the light emitted by said source and reflected by further region, with an increasing distance from said optical axis is reflected as increasingly more convergingly extending light rays.

7. A motor vehicle light as defined in claim 4, wherein said reflector has a transition region in which curvatures of two regions of said reflector which are connected with one another continuously changes.

8. A motor vehicle light as defined in claim 7, wherein said transition region is provided between said apex region and said further region of said reflector.

9. A motor vehicle light as defined in claim 7, wherein said transition region is provided between said further region and an edge region of said reflector.

* * * * *